(12) United States Patent  
Shepherd et al.

(10) Patent No.: US 7,768,735 B2
(45) Date of Patent: Aug. 3, 2010

(54) ANGULAR AND RADIAL LOCATION DETERMINATION IN A CONTROL SYSTEM

(75) Inventors: Stanley H. Shepherd, Morgan Hill, CA (US); Bruce Liikanen, Berthoud, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/846,429

(22) Filed: Aug. 28, 2007

(65) Prior Publication Data

US 2009/0059777 A1 Mar. 5, 2009

(51) Int. Cl.
G11B 21/02 (2006.01)
G11B 5/09 (2006.01)
G11B 5/596 (2006.01)

(52) U.S. Cl. .................. 360/75; 360/49; 360/77.08
(58) Field of Classification Search .............. None
See application file for complete search history.

(56) References Cited

U.S. PATENT DOCUMENTS

| | | | | |
|---|---|---|---|---|
| 4,977,472 A | * | 12/1990 | Volz et al. ............ | 360/78.14 |
| 5,253,131 A | * | 10/1993 | Chevalier ............. | 360/78.14 |
| 5,737,145 A | * | 4/1998 | Jung .................. | 360/77.08 |
| 5,828,508 A | | 10/1998 | Whaley et al. | |
| 6,038,097 A | * | 3/2000 | Le et al. .............. | 360/78.14 |
| 6,104,558 A | | 8/2000 | Greenberg et al. | |
| 6,108,150 A | * | 8/2000 | Lee .................... | 360/48 |
| 6,304,398 B1 | | 10/2001 | Gaub et al. | |
| 6,404,582 B1 | | 6/2002 | Rodrigues de Miranda | |
| 7,106,686 B2 | | 9/2006 | Nishiuchi et al. | |
| 7,110,202 B1 | | 9/2006 | Vasquez | |
| 7,242,546 B2 | * | 7/2007 | Ooi et al. ............. | 360/48 |
| RE39,809 E | * | 9/2007 | Holsinger et al. ...... | 360/72.1 |
| RE39,831 E | * | 9/2007 | Le et al. .............. | 360/78.14 |
| 2006/0133232 A1 | * | 6/2006 | Carson ................ | 369/44.26 |

* cited by examiner

Primary Examiner—K. Wong
(74) Attorney, Agent, or Firm—Fellers, Snider, et al.

(57) ABSTRACT

In accordance with various embodiments, an angular location of a first servo field along an annular track is determined in relation to a difference between a first code value of the first servo field and a second code value of a second servo field along the track. A radial location of the track is obtained in relation to the determined angular location of the first servo field.

22 Claims, 5 Drawing Sheets

EXEMPLARY A/R CODE VALUES — 210

| SEC / CYL | 1 | 2 | 3 | 4 | 5 | 199 | 200 |
|---|---|---|---|---|---|---|---|
| ⋮ | ⋮ | ⋮ | ⋮ | ⋮ | ⋮ | ⋮ | ⋮ |
| 1000 | 1004 | 1012 | 1024 | 1040 | 1060 | 80,600 | 1400 |
| 1001 | 1005 | 1013 | 1025 | 1041 | 1061 | 80,601 | 1401 |
| 1002 | 1006 | 1014 | 1026 | 1042 | 1062 | 80,602 | 1402 |
| 1003 | 1007 | 1015 | 1027 | 1043 | 1063 | 80,603 | 1403 |
| 1004 | 1008 | 1016 | 1028 | 1044 | 1064 | 80,604 | 1404 |
| 1005 | 1009 | 1017 | 1029 | 1045 | 1065 | 80,605 | 1405 |
| 1006 | 1010 | 1018 | 1030 | 1046 | 1066 | 80,606 | 1406 |
| 1007 | 1011 | 1019 | 1031 | 1047 | 1067 | 80,607 | 1407 |
| 1008 | 1012 | 1020 | 1032 | 1048 | 1068 | 80,608 | 1408 |
| 1009 | 1013 | 1021 | 1033 | 1049 | 1069 | 80,609 | 1409 |
| 1010 | 1014 | 1022 | 1034 | 1050 | 1070 | 80,610 | 1410 |
| 1011 | 1015 | 1023 | 1035 | 1051 | 1071 | 80,611 | 1411 |
| 1012 | 1016 | 1024 | 1036 | 1052 | 1072 | 80,612 | 1412 |
| 1013 | 1017 | 1025 | 1037 | 1053 | 1073 | 80,613 | 1413 |
| ⋮ | ⋮ | ⋮ | ⋮ | ⋮ | ⋮ | ⋮ | ⋮ |

ANGULAR AND RADIAL LOCATION DETERMINATION IN A CONTROL SYSTEM

BACKGROUND

Control systems are often used to position a control object. Such control systems often utilize servo data in the form of positional indicia to detect the position of the control object. Depending on the configuration of the control system, the positional indicia can include both radial and angular values.

For example, in some data storage devices the servo data are embedded onto recording surfaces of rotatable storage media to define a number of adjacent concentric tracks (cylinders). User data are stored in data sectors defined along the tracks. A suitable addressing scheme is employed to enable a servo control circuit to identify the physical location of each of the various sectors, so that the transducer can be moved thereto to carry out a requested data I/O operation.

The servo data can indicate radial position such as in terms of identifying a particular track address, and angular position such as along the track with respect to a once-around index (0° reference) point. A disadvantage of some existing control systems, however, is the inability to decode the angular position until the index point is actually reached.

SUMMARY

In accordance with various embodiments, an angular location of a first servo field along an annular track is determined in relation to a difference between a first code value of the first servo field and a second code value of a second servo field along the track. A radial location of the track is obtained in relation to the determined angular location of the first servo field.

BRIEF DESCRIPTION OF THE DRAWINGS

FIG. 7 is a table of exemplary code values obtained during the operation of the routine of FIG. 6.

DETAILED DESCRIPTION

Figure 1:
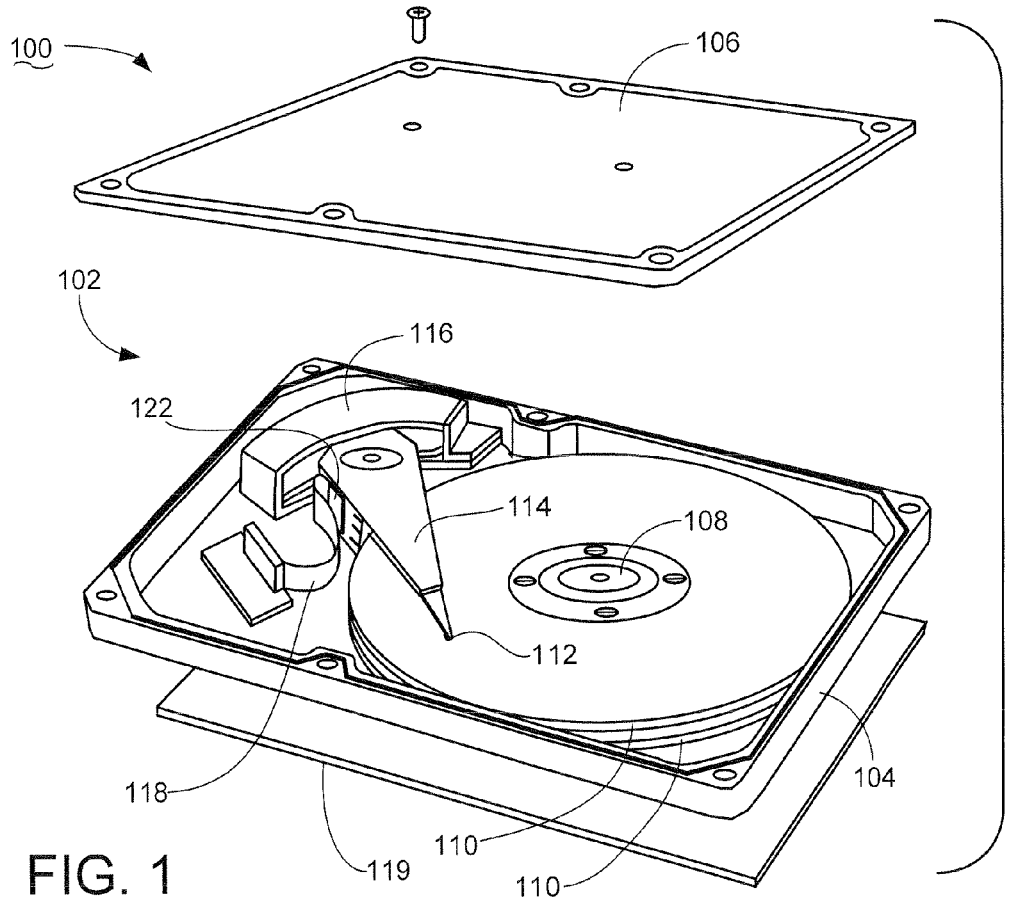
FIG. 1 is an exploded isometric view of an exemplary data storage device in which preferred embodiments of the present invention can be advantageously practiced.

FIG. 1 provides a top plan view of a data storage device 100. The device 100 is preferably characterized as a hard disc drive and is provided to show an exemplary environment in which preferred embodiments of the present invention can be advantageously practiced. It will be understood, however, that the claimed invention is not so limited.

The device 100 includes a housing 102 formed from a base deck 104 and top cover 106. An internally disposed spindle motor 108 is configured to rotate a number of storage media 110. The media 110 are accessed by a corresponding array of data transducers 112. While FIG. 1 shows the use of two magnetic recording discs and four corresponding heads, other numbers of heads and discs (such as a single disc, etc.), as well as other types of media can readily be utilized in the device 100 as desired.

A head-stack assembly ("HSA" or "actuator") is shown at 114. The actuator 114 preferably rotates through application of current to a voice coil motor (VCM) 116. Controlled operation of the VCM 116 causes the transducers 112 to align with tracks defined on the media surfaces to store data thereto or retrieve data therefrom.

A flex circuit assembly 118 provides electrical communication paths between the actuator 114 and device control electronics on an externally disposed printed circuit board (PCB) 119. The flex circuit assembly 118 preferably includes VCM signal paths to accommodate the application of current to the VCM 116, and I/O signal paths to accommodate the transfer of write data to the media 110 and readback data from the media 110, respectively.

Figure 2:
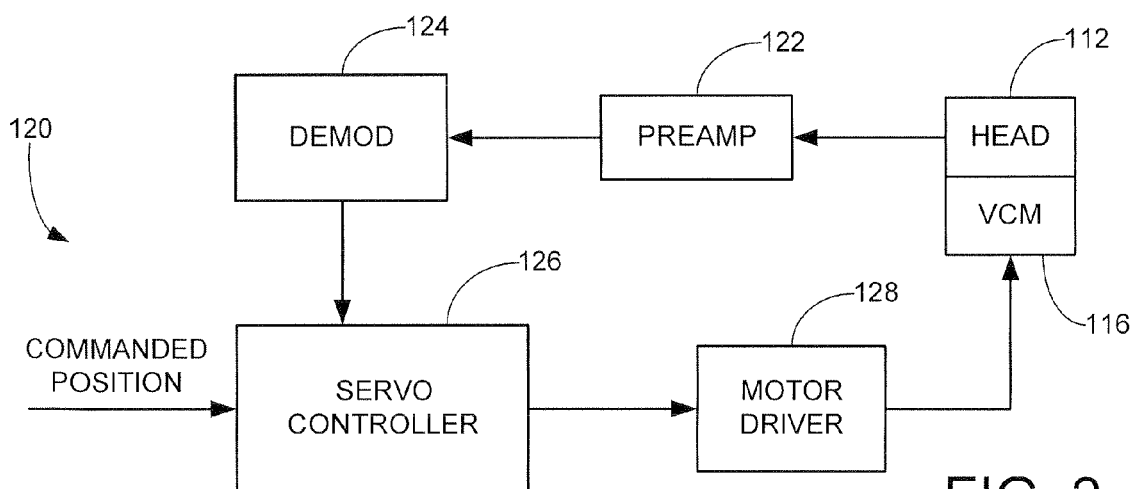
FIG. 2 provides a functional representation of a closed loop servo control circuit of the device of FIG. 1.

FIG. 2 provides a generalized functional block diagram for a closed loop servo control circuit 120 of the device 100. Preferably, embedded servo data are transduced from the media 110 by a selected transducer (head) 112 and provided to a preamplifier/driver (preamp) circuit 122. The preamp circuit 122 is preferably mounted to the side of the actuator 114, as shown in FIG. 1.

The preamp circuit 122 preamplifies and filters the readback signals from the transducer 112, and provides the processed servo data to a demodulation (demod) circuit 124. The demod circuit 124 is preferably disposed on the device PCB 119, and operates to detect and condition the servo data, including application of automatic gain control (AGC) and conversion of the signals to digital form.

A servo controller 126 processes the digitized servo data to generate a current command signal that is supplied to a motor driver circuit 128. In response, the driver circuit 128 applies the appropriate current to the VCM 116 to position the transducer 112.

The servo controller 126 is preferably characterized as a programmable processor with associated servo code to direct the operation of the servo loop, although the controller can take other forms such as being partially or fully realized in hardware. The controller 126 generally operates in two primary modes, seeking and track following. Seeking generally involves controlled movement of the selected transducer 112 from an initial track to a destination track. Track following generally comprises operation of the controller 126 to maintain the selected transducer 112 over the center (or other commanded position) a selected track in order to carry out data I/O operations with the track.

Figure 3:
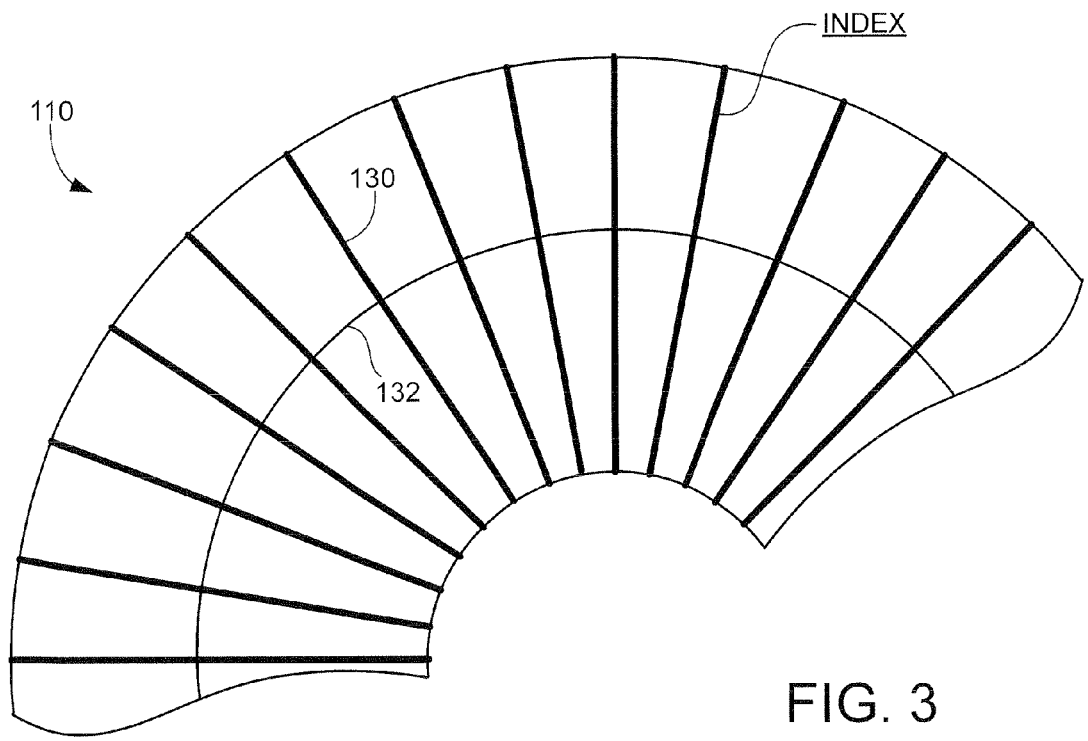
FIG. 3 illustrates a portion of a selected storage medium of FIG. 1 to set forth a preferred arrangement for servo data placed thereon.

FIG. 3 shows a portion of a selected medium 110 from FIG. 1 to illustrate a preferred manner in which servo data are arranged thereon for use by the servo circuit 120 of FIG. 2. A number of spaced apart, radially extending servo wedges 130 extend across the recording surfaces like spokes of a wheel. The servo data are preferably formed during device manufacturing, such as from the use of a servo track writer (STW) station or a self-servo writing operation. Although not required, preferably one of the wedges 130 is selected to provide a once-around index (0° reference) point, as shown.

Figure 4:
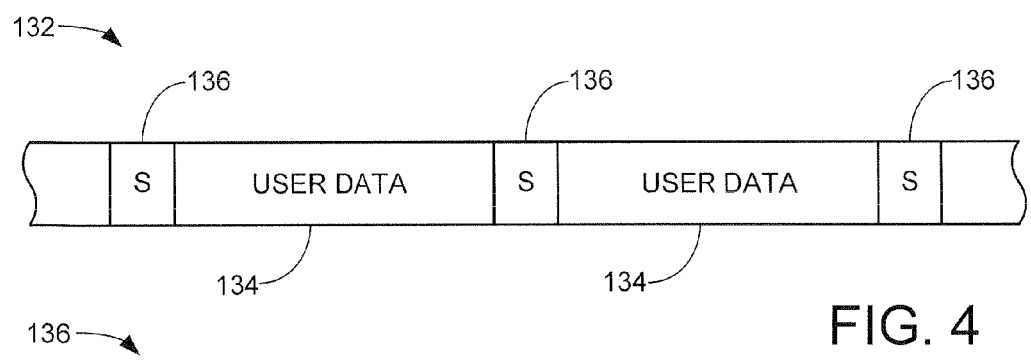
FIG. 4 represents a preferred generalized format for a data track of the device of FIG. 1.

An exemplary data track is shown at 132. The data track 132 circumferentially extends about the medium, preferably in the form of a concentric circle although the track could alternatively form a portion of a spiral. As shown in FIG. 4, user data are stored in intervening regions 134 along the track 132 between adjacent servo fields 136 of the wedges 130. Addressable data sectors (not separately shown) are defined in the regions 134 during a device formatting operation to store fixed amounts of user data (e.g., 512 bytes each).

Figure 5:
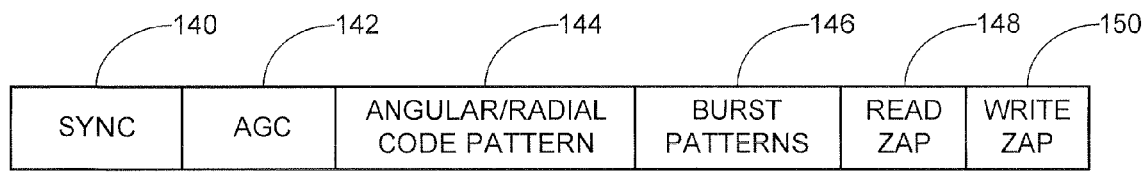
FIG. 5 provides a generalized representation of a preferred format for a servo field of the device.

FIG. 5 shows a preferred arrangement for a selected servo field 136 of FIG. 4, although other arrangements can readily be used. It will be appreciated that each of the wedges 130 of FIG. 3 preferably comprises a succession of immediately adjacent, angularly aligned servo fields 136. It will further be appreciated that the data tracks such as 132 can be arbitrarily defined with respect to the servo data fields 136.

The servo field 136 is shown in FIG. 5 to preferably include a synchronization (sync) field 140 with a unique pattern to enable the servo circuit 120 to detect commencement of the servo field. An automatic gain control (AGC) field 142 allows the demodulation circuitry to establish appropriate gain and frequency settings to prepare the circuit to decode the remainder of the servo data.

As explained below, an angular/radial (A/R) code pattern field 144 provides A/R codes to enable the servo circuit 120 to decode both angular and radial location of the associated field 136. A burst pattern field 146 includes a succession of radially extending dibit patterns (e.g., AB, ABCD, ABCDEF, etc.) to provide intra-track positional alignment. A read zero acceleration path (ZAP) field 148 and a write ZAP field 150 respectively store compensation values that are used by the servo circuit 120 during servo processing to reduce the effects of repeated runout (RRO) error associated with misalignments of the burst patterns.

As will be recognized, some prior art servo systems utilize an index field to provide once-around index reference point identification, and a Gray code (GC) field to provide an encoded track address value. While operable, a disadvantage of this approach is that although the radial location can be immediately determined once the transducer reaches a particular track, the angular location generally remains unknown until the once-around index point is actually reached. This can require a latency period during which the system waits for the medium to rotate adjacent the transducer until the index point is detected, and this latency delays the ability of the system to proceed with an I/O operation upon data sectors on the track.

While such systems can utilize a separate manager function to continually count the servo wedges and thus keep track of how many wedges "to go" until index, this information is not always available upon an initialization or calibration operation. Thus, each time the device is initialized, as well as each time during operation that the index is not properly decoded (due to an error, misalignment, head switch, etc.), it may be necessary to endure this latency period before the system can be resynchronized and normal processing resumed.

By contrast, the A/R codes of field 144 are preferably selected to provide absolute decoding of both angular and radial values for the associated servo field 136 after reading as few as any two successive servo fields along the track 132. Preferably, the A/R codes along a given track are different for each field 144 along that track. Angular location of a selected field is preferably determined in relation to a difference between two successive A/R codes, and the radial location is decoded from the decoded angular position.

Figures 6, 8:
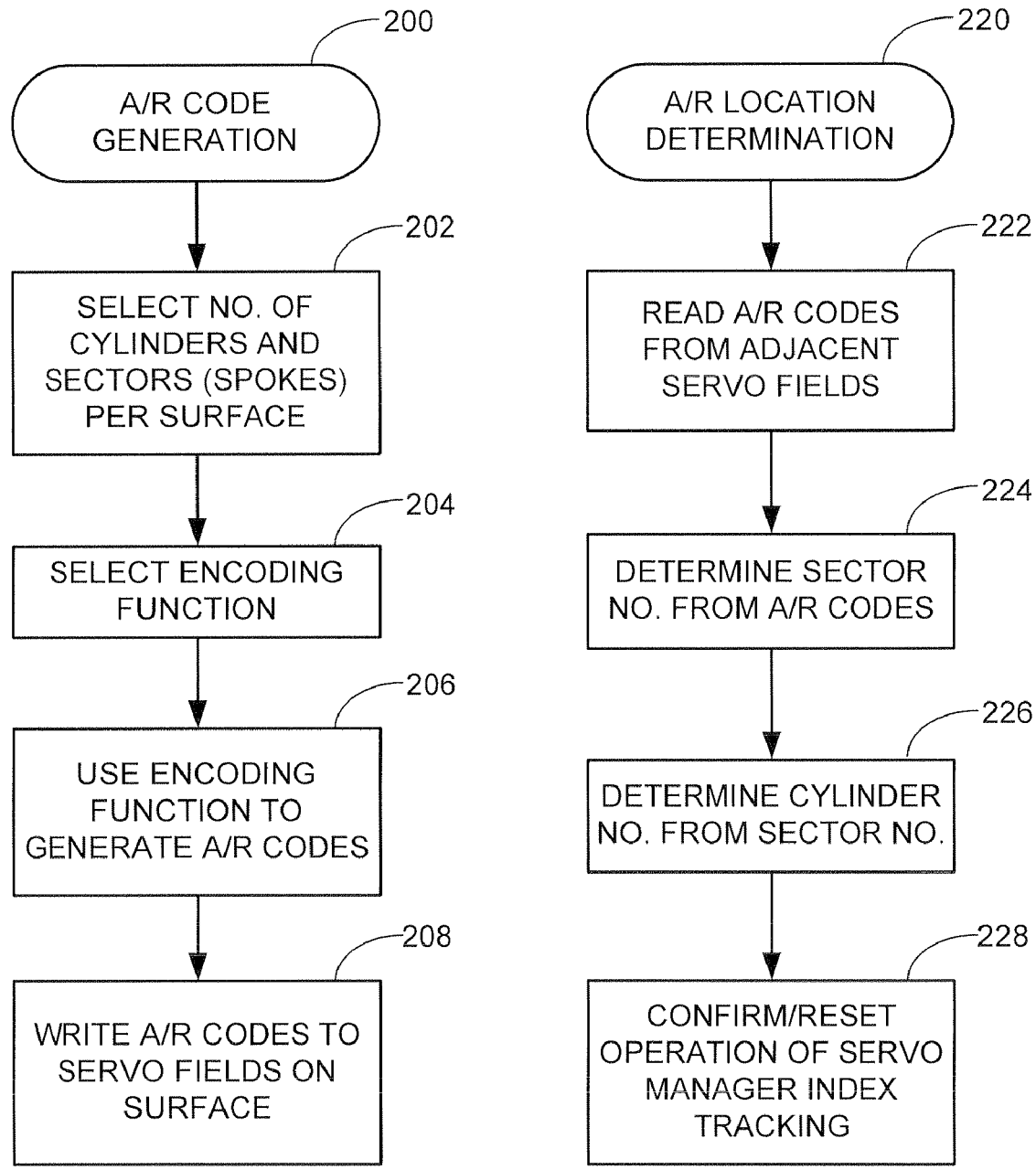
FIG. 6 provides a flow chart to set forth preferred steps to obtain code values for the exemplary device of FIG. 1.
FIG. 8 provides a flow chart to set forth preferred steps to decode angular and radial positions from the code values determined in FIG. 6.

FIG. 6 provides a flow chart for an A/R CODE DETERMINATION routine 200, generally representative of steps carried out in accordance with preferred embodiments to determine appropriate code values for the device 100 of FIG. 1. It will be appreciated that the respective steps set forth in the routine 200 may be modified as appropriate for other types of control systems and applications.

At step 202, an initial format for the device is selected in terms of the number of cylinders (tracks) and the number of servo sectors (wedges) for each recording surface. The values can take any suitable numbers as desired, but for purposes of the present example it will be contemplated that the total number of cylinders is several hundred thousand (e.g., 300,000), and the total number of wedges is in the hundreds (e.g., 200).

At step 204, a suitable encoding function is selected. While a number of alternative exemplary functions will be set forth below, for purposes of the present example a simple encoding function is given as:

$$\text{CODE}(n,k) = \text{CYL}(n) + K^*(\text{SEC}(k))(\text{SEC}(k+1)) \tag{1}$$

where CODE is the A/R code value for a particular field 144, CYL is the sequential cylinder no. (with n from 1 to 300,000), SEC is the sector, or wedge no. (with k from 1 to 200), and K is a constant. K can take any suitable value, but is preferably a power of 2 for computational efficiency. For purposes of providing a simplified example, it will be contemplated that K is set equal to two (K=2).

The code values are next generated at step 206. This preferably entails a stepwise computation through each cylinder 132, and each servo field 136 of each cylinder, using the associated CYL and SEC values. The code values can be generated offline or on-the-fly by the servo controller 126 or other mechanism. At step 208, the values determined during step 206 are written to the respective fields 144 during a suitable STW process.

FIG. 7 shows an exemplary code table 210 to provide illustrative values determined in accordance with the function of step 204. The rows of table 210 indicate the CYL values, with cylinder nos. 1000-1013 shown in particular. The columns of table 210 correspondingly indicate the SEC (wedge) values, with wedge nos. 1-5 and 199-200 shown in particular. Although not required, it is contemplated that wedge no. 1 corresponds to the index point (see FIG. 3).

From the data in FIG. 7 it can be seen that each track is preferably supplied with code values that are unique along that track. For example, the code value for the servo field 136 at cylinder 1000, servo sector 1 is generated in accordance with equation 1 as:

$$\text{CODE}(1000, 1) = 1000 + (2)(1)(2) = 1000 + 4 = 1004 \tag{2}$$

whereas the code value for the servo field 136 at cylinder 1001, servo sector 199 is generated as:

$$\text{CODE}(1001, 199) = 1001 + (2)(199)(200) \tag{3}$$
$$= 1001 + 79{,}600$$
$$= 80{,}601$$

The code value for the servo field 136 at cylinder 1002, servo sector 200 is generated as:

$$\text{CODE}(1002, 200) = 1002 + (2)(200)(1) \tag{4}$$
$$= 1002 + 400$$

= 1402 and so on. It will be appreciated that the various values in table 210 are represented in base 10 format; the corresponding values are each preferably written to the fields 144 as a multi-bit logical (e.g., base 2) sequence. Additional encoding such as run length limiting (RLL) encoding can be applied to the values represented in table 210 to enhance fault tolerance and data recovery. The total bit-size of the A/R code pattern fields 144 will be selected to accommodate the largest encoded code value(s). It is contemplated that in most cases, the fields 144 will have a size that is equal to or less than the size of a conventional GC field for a particular device (e.g., 16 bits or less).

The angular location (position) in terms of sector no. is preferably decoded from any two adjacent code values from FIG. 7 in accordance with the following relationship:

$$SEC(k)=(CODE(n,k)-CODE(n,k-1))/(2*K) \quad (5)$$

Where SEC(k) is the particular servo sector 136 in question, CODE(n,k) is the code value from that servo sector, CODE(n,k−1) is the previously read code value from the immediately preceding servo sector on the associated track, and K is the constant from equation (1). By way of illustration, the respective code values at (1000:2) and (1000:3) in FIG. 7 are 1012 and 1024, respectively. From equation (4), these values provide:

$$SEC(k)=(1024-1012)/(2*2)=12/4=3 \quad (6)$$

In other words, the servo sector with CODE=1024 is affirmatively identified as servo wedge no. 3, or the second wedge after the index. Similar decoding can be readily determined for each of the remaining pairs of servo fields on the device.

In the present example, the simplified function of equation (1) does not necessarily produce excessively large code values. Nevertheless, a suitable rounding (modulo) function can be applied to the code values in equation (5) to strip off the unnecessary larger order bits and reduce complexity of the processing effort.

Once the angular location is known, the radial location (e.g., cylinder no.) is readily determined as:

$$CYL(n)=CODE(n,k)-K*(SEC(k))(SEC(k+1)) \quad (7)$$

Where as before, CODE is the code value for a selected servo field 136 at wedge no. SEC(k), and SEC(k+1) is the subsequent wedge number. Using the example from equation (6) above, after having determined for the selected servo field 136 a code value of 1024 and a wedge no. of 3, equation (7) provides:

$$CYL(n)=1024-(2)(3)(4)=1024-24=1000 \quad (8)$$

From the table 210 of FIG. 7 it will be noted that some code values are the same for different wedges on different tracks. For example, the servo fields 136 at (1008, 1) and (1000, 2) both have code values of 1012; the servo fields 136 at (1013, 2) and (1001, 3) both have code values of 1025, etc. Nevertheless, since it is preferably not the code value itself, but rather the difference (numeric interval) between the code value and an adjacent code value that identifies the angular position, the use of the same A/R codes on different tracks will still generally provide unique solutions to the angular and radial position query for each servo field 136.

To the extent that any ambiguities arise from a given encoding scheme, additional pairs of servo fields can be sampled during the decoding process to confirm the accuracy of the decoded angular and radial locations. For example, a second angular location for the second servo field can be determined using the second code value and the next (third) code value, etc.

A review of the exemplary table 210 of FIG. 7 shows sequentially incrementing code values along each servo wedge. While higher order functions may provide different results, such incremental properties of the A/R code generation function can be identified and used to efficiently fill in the remaining values for the table prior to the writing of the values to the media (step 208 of FIG. 6).

FIG. 8 provides a flow chart for an ANGULAR AND RADIAL LOCATION DETERMINATION ROUTINE 220, generally representative of steps carried out in accordance with preferred embodiments in view of the foregoing discussion. Successive code values (CODE1, CODE2) are preferably obtained at step 222, such as through the sequential reading of the associated fields 144 of adjacent servo fields 136 along a selected track.

The code values are used to identify angular location at step 224 such as in accordance with equation (5), and the angular location is used at step 226 to determine the radial location such as in accordance with equation (7). As indicated at step 228, the detected angular and/or radial locations can further be used as desired to initiate or confirm tracking thereof by a separate manager of the servo circuit, as set forth by FIG. 9.

Figure 9:
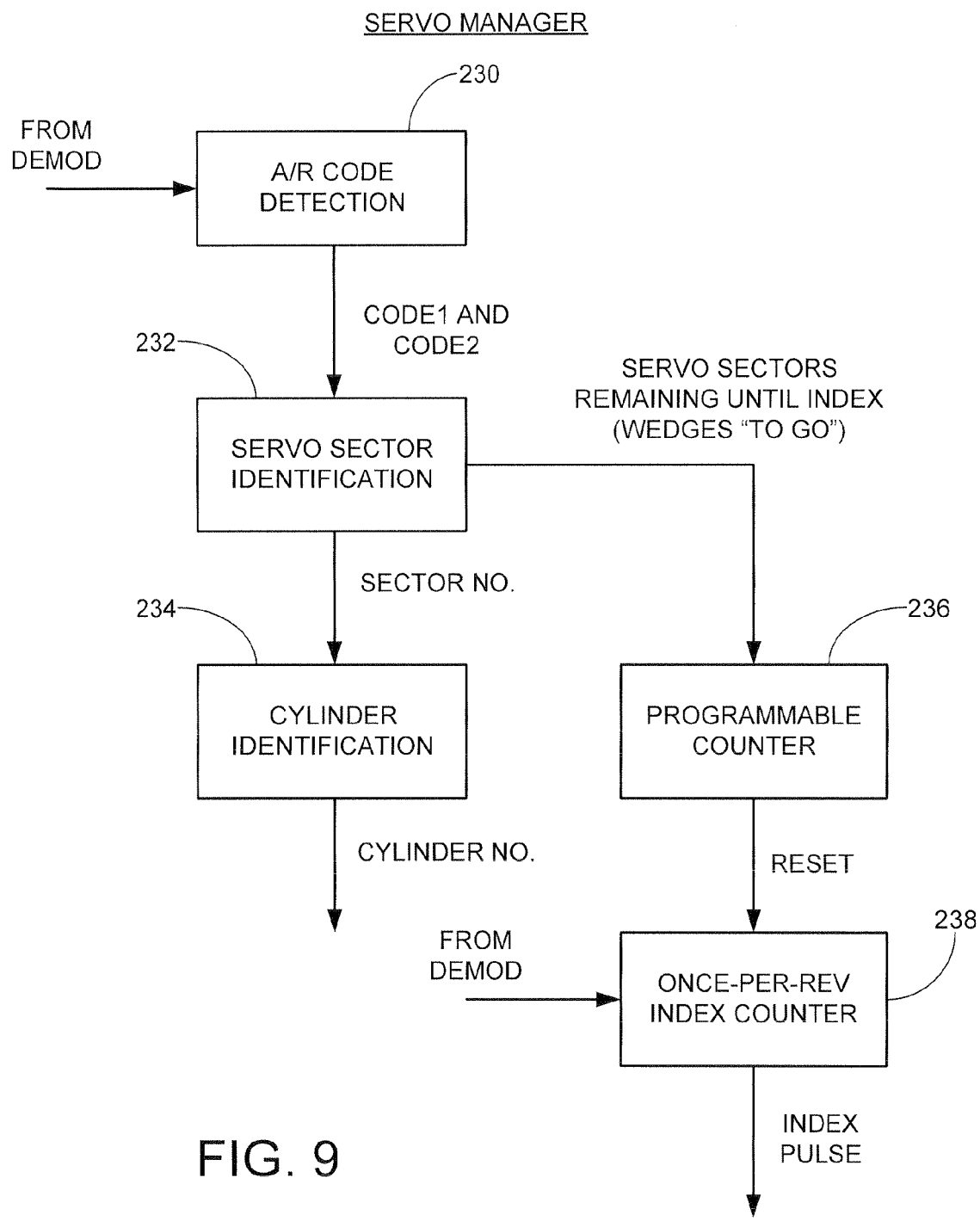
FIG. 9 sets forth a generalized functional block diagram of a portion of the exemplary servo circuit of FIG. 2.

FIG. 9 provides an illustrative, simplified functional representation of portions of the servo controller 126 in accordance with a preferred embodiment. It is contemplated that the circuitry in FIG. 9 is operative in a state during or immediately following an initialization or calibration state so that the absolute angular and radial position of the transducer is either unknown, or is uncertified (i.e., not fully verified). It is also contemplated that the servo circuit 120 has commanded the associated transducer 112 to commence track following along a selected data track 132.

At such point, processed read signals are supplied to a code detection block 230 from the demod circuitry 124 (FIG. 2). These signals are transduced from the A/R code pattern fields 144 (FIG. 5) of first and second servo fields 136 encountered along the followed track.

The block 230 generally operates to identify the CODE1 and CODE2 values from the supplied signals. This operation may include the application of RLL decoding or other processing as required.

The decoded CODE1 and CODE2 values are supplied to an angular position detection block 232 which identifies an angular position of the associated servo field 136. As discussed above, the angular position is preferably expressed as a particular wedge no. in which the servo field 136 is disposed.

This information is provided to a radial position detection block 234 which identifies a radial position of the associated servo field 136 therefrom. As before, the radial position is preferably expressed as the particular cylinder in which the servo field 136 is disposed; that is, the block 234 preferably decodes a track address for the track being followed.

In a preferred embodiment, the block 232 further outputs a signal indicative of the number of wedges "to go" until the index reference point is reached. In the above example, if the wedge no. is found to be 3, then at this point the system knows that there are 200−3=197 wedges to go before the once-around index point reaches the transducer. However, since the absolute value is known now, it is not necessary to endure a rotational latency period which the system waits until index is reached before I/O operations commence.

Accordingly, the wedges to go value can be used by the manager to provide servo tracking. While a number of solutions can be used, in FIG. 9 the wedges to go value is loaded to a programmable counter 236 which initiates a decrementing countdown until index is reached; that is, the counter 236 decrements each time a successive servo wedge 130 passes the transducer 132. Once the counter 236 reaches the index point, the counter 236 resets an index counter 238 that thereafter operates to output an index pulse each time the index point is detected.

It will be appreciated that the foregoing embodiments preferably eliminate the need to provide separate index and GC (or other track addressing) fields. This, along with a reduction in the size of the A/R code pattern fields, reduces overhead and expands the media space available to store user data.

However, in an alternative preferred embodiment, a separate index bit is maintained and used (either as part of the A/R field 144 or another field in the servo wedges 130) in a nominally conventional fashion to provide an independent once-around index detection mechanism. In such case, an index counter such as at 238 can operate based on the detection of the index pulses while a separate counter or other circuitry can provide an independent index indication using the routine of FIG. 8 for authentication purposes. In this way, enhanced reliability and robustness in the face of anomalous conditions can be achieved with regard to maintaining index synchronicity.

As mentioned above, any number of other encoding/decoding schemes can be utilized in lieu of the exemplary scheme of equations (1), (5) and (7). For example, one alternative encoding scheme can be expressed as:

$$\text{If } (SEC(k) \,\&\, 1), \text{ then } CODE(n,k) = CYL(n) + K^*SEC(k) \\ \text{else } CODE(n,k) = CYL(n) \quad (9)$$

This will generally provide an incremented sequence of (0, 1, 0, 3, 0, 5 . . . ) along the track. Thereafter, during the decoding of CODE1 and CODE2 values, $$\text{If } CODE(k) > CODE(k-1), \text{ then } SEC(k) = CODE(k) - CODE(k-1) \text{ else } SEC(k) = 1 + CODE(k-1) - CODE(k) \quad (10)$$

Other possible encoding schemes include:

$$\text{If } (SEC(k) \,\&\, 1), \text{ then } CODE(n,k) = CYL(n) + K^*SEC(k) \\ \text{else } CODE(n,k) = CYL(n) - K^*SEC(k) \quad (11)$$

which generally provides an incremental sequence of (0, 1, −2, 3, −4 . . . ). Another possible encoding scheme is:

$$\text{If } (SEC(k) \,\&\, 1), \text{ then } CODE(n,k) = CYL(n) + SEC(k+1)/2 \\ \text{else } CODE(n,k) = CYL(n) - SEC(k+1)/2 \quad (12)$$

which generally provides an incremental sequence of (0, −1, 1, −2, 2 . . . ). Other encoding and decoding schemes can be readily devised in view of the foregoing discussion and tailored to the requirements of a particular application.

While the various preferred embodiments discussed herein have generally been embodied in the environment of a data storage device that controls a transducer adjacent a storage medium, such is not limiting as the disclosed subject matter can have any number of practical applications in other types of control systems. The term "track" will accordingly be understood broadly to describe a trajectory associated with a control object, irrespective of whether data are, or can be, stored therealong.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising identifying absolute angular and radial positions of a control object by determining a numeric interval between two unique code values stored along an associated servo track.

2. The method of claim 1, further comprising a step of positioning a control object with respect to the track in relation to the angular and radial positions.

3. The method of claim 1, wherein the two code values are respectively stored in first and second fields separated along the track by at least one user data field in which user data are stored.

4. The method of claim 1, wherein a controller determines the numeric interval by subtracting a first code value of the two code values from a second code value of the two code values.

5. The method of claim 1, wherein the track annularly extends along a rotatable storage medium across which spaced apart servo wedges radially extend, wherein a first code value of said two code values is stored in a first servo field which forms a portion of a first servo wedge and a second code value of said two code values is stored in a second servo field which forms a portion of a second servo wedge, and wherein the absolute angular position identifies a non-zero number of wedges to go between the first servo wedge and a third servo wedge at an index reference point.

6. The method of claim 1, further comprising identifying a once-around index reference point of a medium on which the track is defined from the absolute angular position.

7. The method of claim 1, further comprising prior steps of generating a unique code value for each of a plurality of servo fields along the track, wherein the absolute angular and radial positions are determined for each pair of immediately successive servo fields along the track from the numeric interval between the associated unique code values.

8. The method of claim 1, wherein the obtaining step comprises determining the radial position of the track in relation to a combination of the angular position and a first code value of the two code values.

9. The method of claim 1, in which the associated servo track comprises an annular path at a selected radius of a rotatable storage medium along which a plurality of said code values are stored each constituting a different multi-bit value.

10. the method of claim 9, in which each servo track on the medium has a unique sequence of said code values.

11. An apparatus comprising a rotatable member along which an annular servo track is defined comprising a first servo field with an associated first code value and a second servo field with an associated second code value, the first and second code values selected such that an angular location of the first servo field is expressed in relation to a numeric interval between the first and second code values, and a radial location of the track is expressed in relation to the angular location.

12. The apparatus of claim 11, wherein the rotatable member comprises a storage medium.

13. The apparatus of claim 11, further comprising a control system which determines the angular and radial locations of the first servo field and positions a control object adjacent the rotatable member accordingly.

14. The apparatus of claim 13, wherein the control object comprises a transducer which transduces the first and second code values from the first and second servo fields, respectively.

15. The apparatus of claim 11, wherein the radial location of the track is expressed in relation to a combination of the angular location and the first code value.

16. The apparatus of claim 11, wherein the numeric interval is determined by subtracting a selected one of the first or second code values from a remaining one of the first or second code values.

17. The apparatus of claim 11, wherein the annular track is defined by a plurality of angularly spaced apart servo fields arranged along said track and each having a different associated code value.

18. The apparatus of claim 17, wherein the annular track is characterized as a first track, and wherein a third servo field arranged along a second track on the rotatable member has a third code value equal to the first code value of the first servo field of the first track.

19. A method comprising storing a unique code value in each servo field along a servo track on a medium, transducing the associated code values from any two successive servo fields of the track, determining a numeric interval between the transduced code values, identifying an absolute angular position of the transducer from the determined numeric interval, and identifying an absolute radial position of the transducer from the absolute angular position.

20. The method of claim 19, wherein the plurality of spaced apart servo fields define a plurality of tracks on the medium, and wherein each of the servo fields along each track has a unique code value which, when combined with the unique code value of an immediately adjacent servo field, uniquely resolves said absolute angular and radial positions.

21. The method of claim 19, wherein the using step comprises reading a first code value from a first servo field on a selected track, reading a second code value from a second servo field on the selected track, and resolving said absolute angular and radial positions in relation to a difference between the first and second code values.

22. The method of claim 19, wherein said any two successive servo fields are each located a non-zero number of servo fields away from a servo field located at a once-per-revolution index reference point, and wherein the absolute angular position identifies said non-zero number.

* * * * *